United States Patent
Banus Ricoma

(10) Patent No.: US 9,901,507 B2
(45) Date of Patent: Feb. 27, 2018

(54) MUSCLE-STRETCHING APPARATUS

(71) Applicant: Esteban Banus Ricoma, Las Palmas (ES)

(72) Inventor: Esteban Banus Ricoma, Las Palmas (ES)

(*) Notice: Subject to any disclaimer, the term of this patent is extended or adjusted under 35 U.S.C. 154(b) by 150 days.

(21) Appl. No.: 15/137,025

(22) Filed: Apr. 25, 2016

(65) Prior Publication Data
US 2017/0281451 A1    Oct. 5, 2017

(30) Foreign Application Priority Data

Apr. 4, 2016 (ES) ............... 201630418 U

(51) Int. Cl.
*A61H 1/02* (2006.01)
*A63B 23/10* (2006.01)

(52) U.S. Cl.
CPC ..................... *A61H 1/02* (2013.01)

(58) Field of Classification Search
CPC .......... A63B 21/0023; A63B 2023/006; A63B 2225/09; A63B 2208/0204; A63B 21/00047; A63B 21/002; A63B 21/068; A63B 2220/51; A63B 23/03508; A63B 23/10; A61H 1/02
USPC ..................................... 482/79, 91
See application file for complete search history.

(56) References Cited

U.S. PATENT DOCUMENTS

| | | | | |
|---|---|---|---|---|
| 3,006,643 A * | 10/1961 | Ryan | ................. | A61G 13/009 273/DIG. 6 |
| D219,745 S * | 1/1971 | Windscheffel | ................. | 482/142 |
| 4,531,730 A * | 7/1985 | Chenera | ........... | A63B 23/03516 269/17 |
| 5,620,404 A * | 4/1997 | Eyman | ............... | A63B 23/0488 482/142 |
| 5,879,272 A * | 3/1999 | Mekjian | ............. | A63B 69/0035 482/131 |
| 6,589,141 B1 * | 7/2003 | Flaggs | ................. | A63B 23/04 482/79 |
| 7,044,901 B2 * | 5/2006 | Weir | ................. | A63B 21/078 482/142 |
| 7,070,540 B1 * | 7/2006 | Priester | ................. | A63B 5/16 14/69.5 |
| 9,433,813 B1 * | 9/2016 | Cervantez | .......... | A63B 23/0458 |
| 2007/0219071 A1 * | 9/2007 | Hamer | ............... | A63B 21/0552 482/79 |

* cited by examiner

*Primary Examiner* — Andrew S Lo

(57) ABSTRACT

A muscle-stretching apparatus, which comprises a frame that incorporates a first and a second group of rods, wherein the frame is in turn made up of two parts mutually linked by said rods through fastening means; and the second group of rods is longer than the first group of rods; the parts being flat in nature and having a similar geometry, and being adapted for resting on the ground; and in use, the parts are arranged symmetrically to one another, relative to a plane perpendicular to the ground; the variable height of the second group of rods relative to the ground in their arrangement between the parts determining the useful height H of the frame relative to the ground.

6 Claims, 6 Drawing Sheets

FIG.1
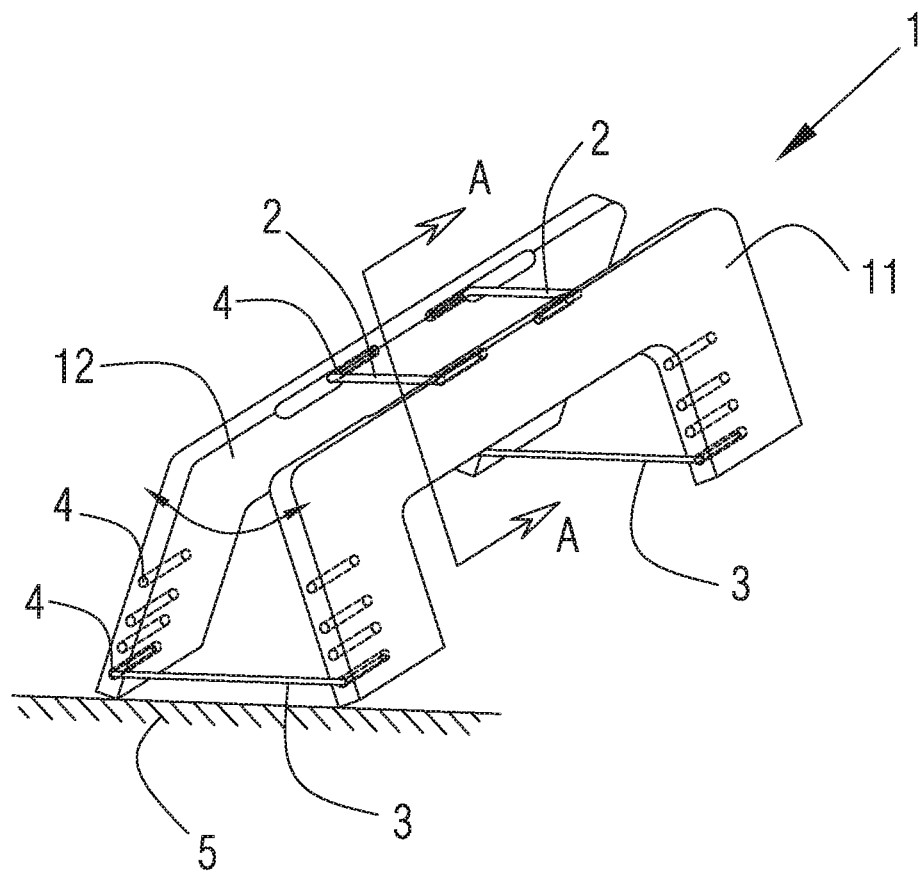
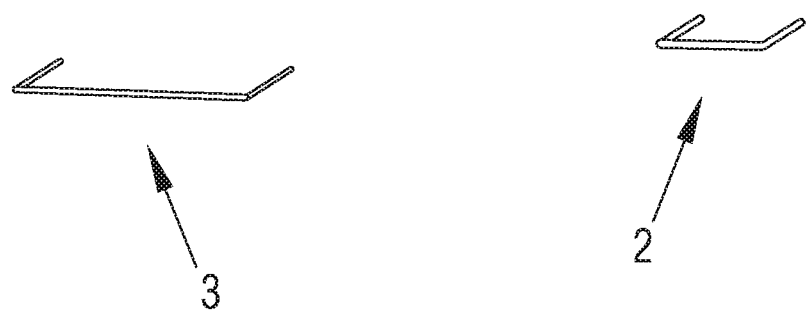

A-A

FIG.4
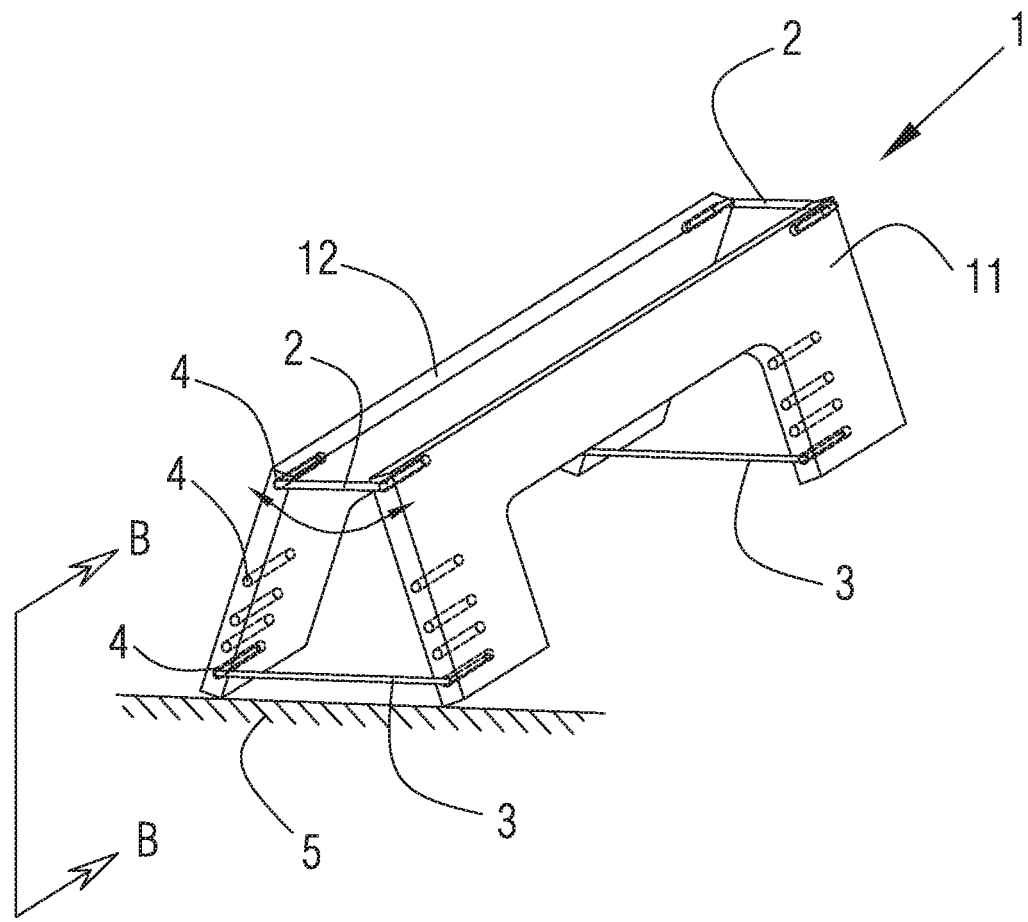
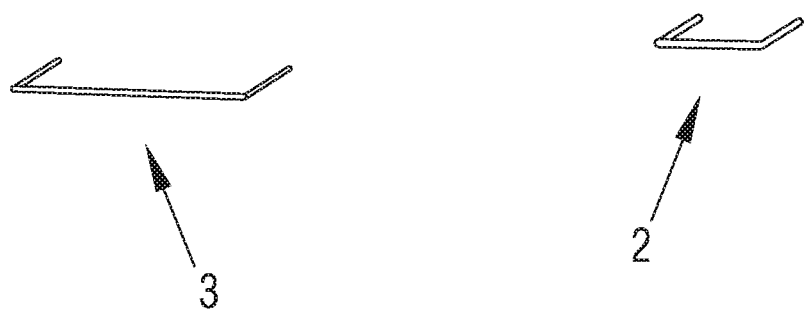

B-B

MUSCLE-STRETCHING APPARATUS

RELATED APPLICATION

This application claims the benefit of priority of Spanish Patent Application No. 201630418 filed Apr. 4, 2016, the contents of which are incorporated herein by reference in their entirety.

FIELD AND BACKGROUND OF THE INVENTION

The aim of the present patent application is to register a muscle-stretching apparatus, which incorporates significant innovations and advantages over the techniques used to date.

More specifically, the invention proposes the development of a muscle-stretching apparatus that, due to its particular arrangement, allows the users, who need to stretch their muscles, a more effective use thereof.

In the current state of the art it is known that physical exercise improves mental functions, autonomy, memory, speed, "body image" and the feeling of well-being, since stability in the personality is achieved characterized by optimism, euphoria and mental flexibility.

All the experts recommend, before and after carrying out any sports activity, to stretch in order to prevent injuries and degeneration in the joints.

Stretching is understood to mean the exercises intended to increase the ability to induce muscle elongation in order to overcome and adapt the contraction reflex or stretching reflex.

Generally, amateur athletes carry out stretch exercises without the help of special apparatuses, using street fixtures located in parks and gardens or in other places and that are not designed for this purpose, which is why the stretches carried out are not fully effective.

It is thus necessary to offer, particularly to amateur athletes, the possibility to carry out the necessary stretching in places that are not specifically designed for this purpose.

The present invention helps to solve and overcome the present set of problems, as it makes it possible for the users to carry out the necessary stretches in many different places and sites, either at the athlete's home or at the gymnasium and sports centers, before and after doing sports, given that it is easily portable by the users themselves, as it can be assembled and disassembled in a very simple way, in addition to requiring very little space for its use or storage at home or at the sports center.

SUMMARY OF THE INVENTION

The present invention has been developed with the aim of providing a muscle-stretching apparatus, and is substantially characterized in that it comprises a frame that incorporates a first group of rods and a second group of rods, wherein the frame is in turn made up of two independent parts mutually linked by said rods through fastening means; and the first group of rods comprises at least one rod of a given length, and the second group of rods comprises at least another rod, which is longer than the first group of rods; the parts being flat in nature and having a similar geometry, and being adapted for resting on the ground, and in use, the parts are arranged symmetrically to one another, relative to a plane perpendicular to the ground; the first group of rods being arranged between the parts to link the two parts at the portion thereof opposite to the portion that is in contact with the ground and providing mutual variable inclination ability between said two parts; and the second group of rods also being arranged between the two parts for their mutual linking and in a position that varies in height relative to the ground; wherein, when the rods are arranged between the parts, the variable height of the second group of rods relative to the ground determines the mutual inclination and the angular aperture between the two parts and therefore of the useful height H of the frame relative to the ground.

As an alternative, in the muscle-stretching apparatus, the parts have a trapezoidal geometry.

As an alternative, in the muscle-stretching apparatus, the parts have a parallelogram geometry.

Additionally, in the muscle-stretching apparatus, the fastening means comprise elongated recesses or holes arranged in the parts, suitable for inserting and positioning the ends of the rods.

As an alternative, in the muscle-stretching apparatus, the recesses and rods have a mutual arrangement of the male-female coupling type.

As an alternative, in the muscle-stretching apparatus, the rods have a U-shaped geometry.

The present invention makes it possible for users to stretch themselves in many different places and sites, either at the athlete's home or at the gymnasium and sports centers before and after doing sports, given that it is easily portable by the users themselves, as it can be assembled and disassembled in a very simple way, in addition to requiring very little space for its use or storage at home or at the sports center.

Other characteristics and advantages of the muscle-stretching apparatus will become clear in light of the description of a preferred, though non-exclusive, embodiment, which, by way of a non-limiting example, is illustrated in the accompanying drawings, wherein:

BRIEF DESCRIPTION OF THE SEVERAL VIEWS OF THE DRAWINGS

FIG. 1—Is a schematic perspective view of a preferred embodiment of the muscle-stretching apparatus of the present invention.

FIG. 4—Is a schematic perspective view of another preferred embodiment of the muscle-stretching apparatus of the present invention.

DESCRIPTION OF SPECIFIC EMBODIMENTS OF THE INVENTION

Figure 2:
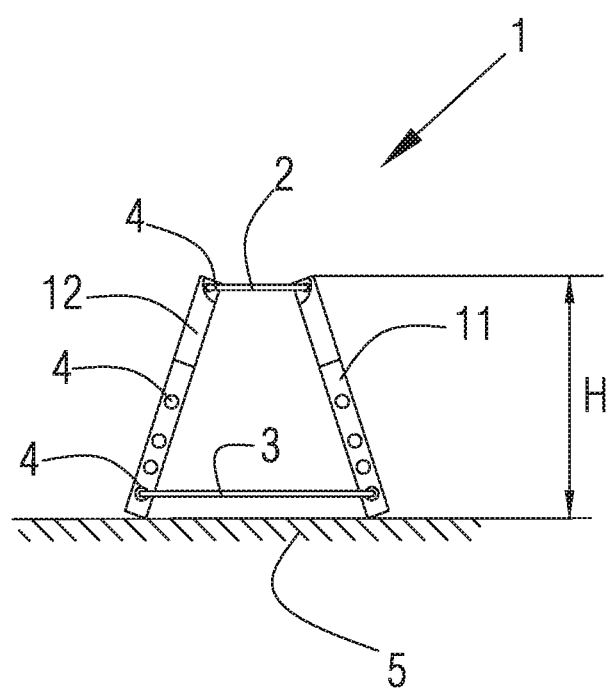
FIG. 2—Is a schematic view of the cross-section A-A indicated in FIG. 1.

As schematically shown in FIG. 1, the muscle-stretching apparatus of the present invention, comprises a frame 1 that incorporates a first group of rods 2 and a second group of rods 3. Likewise, the same frame 1 is made up of two parts 11, 12 spaced apart and mutually linked by said rods 2, 3 through fastening means.

In this preferred embodiment, the rods 2, 3 have a U-shaped general geometry. So it can be best appreciated, the rods 2, 3 are represented separately in the same FIG. 1.

The first group of rods 2 comprises at least one rod 2 of a given length. The second group of rods 3 comprises at least another rod 3, longer than the first group of rods 2.

In this preferred embodiment, the first group of rods 2 comprises two rods 2, and the second group of rods 3 comprises two rods 3.

Parts 11, 12 are flat in nature and have a similar geometry, and are adapted for coming into contact with and resting on the ground 5.

In this preferred embodiment, the parts 11, 12 have a trapezoidal geometry, and are arranged symmetrically to one another, relative to a plane perpendicular to the ground and interposed between the two parts 11, 12. In other preferred embodiments, the parts 11, 12, may have a parallelogram geometry, for example.

In this preferred embodiment, the fastening means comprise elongated recesses 4 by way of holes arranged in the parts 11, 12, and suitable for inserting and positioning the rods 2, 3, which are represented with a broken line in FIG. 1 as they are hidden inside the parts 11, 12.

In other preferred embodiments, the recesses 4 and the rods 2, 3 may have a mutual arrangement in a male-female type of coupling.

The first group of rods 2 is arranged between the parts 11, 12 through the recesses 4, the ends of the rods 2 being inserted into said recesses 4, which act as a link between those two parts 11, 12 at the section thereof opposite to the portion that is in contact with the ground 5. In addition, said first group of rods 2 provides the possibility of a mutual variable inclination between said two parts 11, 12, as represented by the arrows in FIG. 1.

As can be observed in the diagram of FIG. 1 and also in the cut A-A made in FIG. 1, the cross-sectional cut A-A of which has been represented in FIG. 2, the second group of rods 3 is also arranged between the two parts 11, 12 upon the insertion of the ends of the rods 3 in said recesses 4, and in a position above the ground, which varies in height depending on the recesses 4 of the parts 11, 12 used for the positioning thereof.

As can be observed in FIGS. 1 and 2, the variable height relative to the ground 5 at which the second group of rods 3 is positioned, depending on the recesses 4 of the parts 11, 12 that have been used, therefore determines the mutual inclination between the two parts 11, 12 and the degree of their mutual angular aperture.

Figure 3:
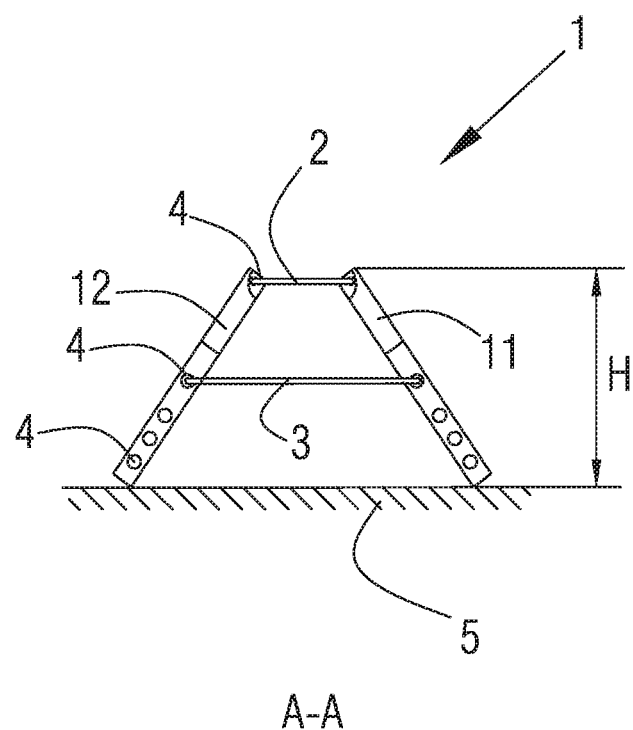
FIG. 3—Is a schematic view indicating the use of the muscle-stretching apparatus of the present invention, as compared with FIG. 2.

As can be observed when comparing FIGS. 2 and 3, when the second group of rods 3 is positioned higher up, depending on the recess 4 chosen, the degree of angular aperture increases between the two parts 11, 12, which implies that the useful height of the upper edge of parts 11, 12 decreases, and therefore the useful height H of the frame 1, relative to the ground 5.

As explained above, said variable degree of angular aperture between the two parts 11, 12 of the frame 1 determines the useful height H of the upper edge of the frame 1 itself relative to the ground 5, according to the different needs of the user.

In use, the user must rest the tip of the foot against the upper portion of the frame 1, and the heel directly onto the ground 5, in order to carry out the muscle stretches in said area of his/her body.

Depending on the positioning of the second group of rods 3, the useful height H of the frame 1 of the upper portion thereof wherein the users place the tip of their foot, may vary according to the specific needs of the users, as can be observed, particularly when comparing FIGS. 2 and 3.

Figure 5:
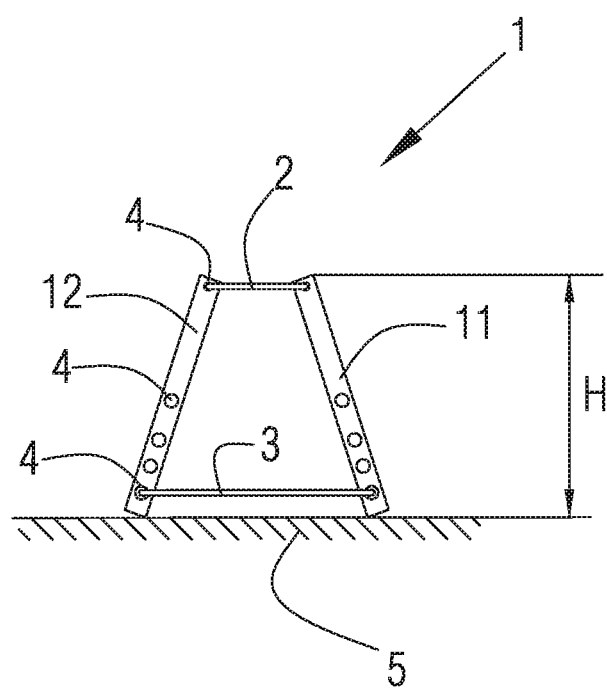
FIG. 5—Is a schematic view of a side perspective B-B of the preferred embodiment of the muscle-stretching apparatus of the present invention represented in FIG. 4.
Figure 6:
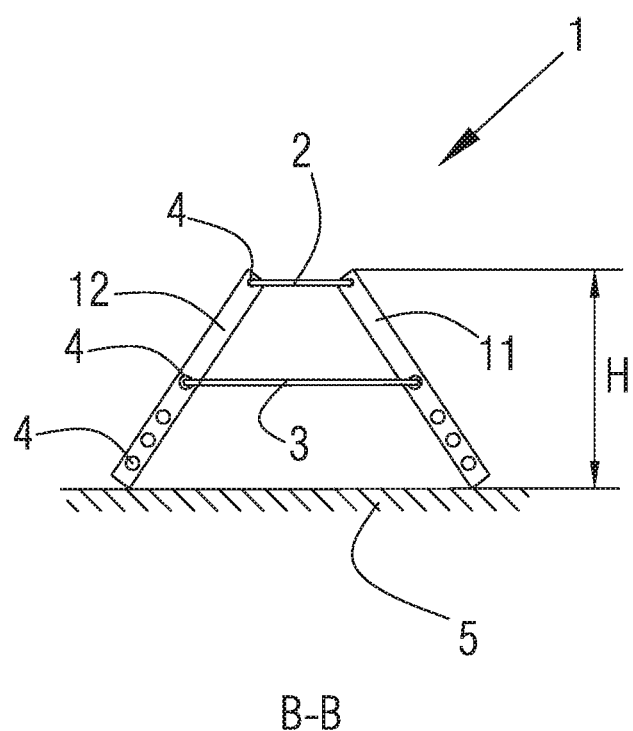
FIG. 6—Is a schematic view indicating the use of the muscle-stretching apparatus of the present invention, as compared with FIG. 5.

In another preferred embodiment of the same invention, schematically represented in FIG. 4, and from a side perspective B-B of the same FIG. 4, in FIGS. 5 and 6, the recesses 4 corresponding to the positioning of the rods 2 are arranged at the ends of parts 11, 12.

The described arrangement of the muscle-stretching apparatus of the present invention makes it possible to be very easily assembled and disassembled by the users themselves, which is also due to the absence of bolting elements.

When the apparatus is not in use and is in a disassembled state it can be very easily moved, as it is made of light materials. Moreover it takes up very little space, such that it is perfectly possible to carry the apparatus inside a suitcase and when traveling, for example.

The details, shapes, dimensions and other accessory elements, as well as the materials used to manufacture the muscle-stretching apparatus of the invention, may be suitably substituted for others which are technically equivalent, and do not diverge from the essential nature of the invention, nor the scope defined by the claims included below.

What is claimed is:

1. A muscle-stretching apparatus comprising: a frame (1), which incorporates a first group of rods (2) and a second group of rods (3), wherein the frame (1) is made up of two parts (11, 12) spaced apart and mutually linked by said first and second group of rods (2, 3) through fastening means; and wherein the first group of rods (2) comprises at least one rod (2) of a given length, and the second group of rods (3) comprises at least another rod (3), which is longer than the first group of rods (2); the two parts (11, 12) each being flat and having a similar geometry, and being adapted for resting on a ground (5), and in use the two parts (11, 12) are arranged symmetrically to one another, relative to a plane perpendicular to the ground (5); the first group of rods (2) being arranged between the two parts (11, 12) to link the two parts (11, 12) together at an upper portion of the two parts, opposite to a lower portion of the two parts that is in contact with the ground (5) and configured to provide mutual variable inclination between said two parts (11, 12); and the second group of rods (3) also being arranged between the two parts (11, 12) for linking the two parts (11, 12) together, wherein the second group of rods (3) are configured to be coupled to the fastening means which are positioned at various heights on each of the two parts (11, 12), wherein a height at which the second group of rods (3) are coupled to the two parts (11, 12) define the inclination between the two parts (11,12) and determine a height (H) of the frame (1) relative to the ground (5).

2. The muscle-stretching apparatus according to claim 1, wherein the two parts (11, 12) each have a trapezoidal geometry.

3. The muscle-stretching apparatus according to claim 1, wherein the two parts (11, 12) each have a parallelogram geometry.

4. The muscle-stretching apparatus according to claim 1, wherein the fastening means comprise elongated recesses (4) or holes arranged in each of the two parts (11, 12), suitable for inserting and positioning ends of the first and second group of rods (2, 3).

5. The muscle-stretching apparatus according to claim 4, wherein the recesses (4) and the first and second group of rods (2, 3) have a mutual arrangement of a male-female coupling type.

6. The muscle-stretching apparatus according to claim 1, wherein the first and second group of rods (2, 3) have a U-shape geometry.

\* \* \* \* \*